United States Patent
Kim et al.

(10) Patent No.: US 6,826,142 B2
(45) Date of Patent: Nov. 30, 2004

(54) METHOD OF AND APPARATUS FOR REPRODUCING DATA RECORDED ON AN OPTICAL DISC

(75) Inventors: Tae-kyung Kim, Seoul (KR); Young-man Ahn, Gyeonggi-do (KR); Jong-bae Kim, Seoul (KR); Chong-sam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 10/046,556

(22) Filed: Jan. 16, 2002

(65) Prior Publication Data

US 2002/0186644 A1 Dec. 12, 2002

(30) Foreign Application Priority Data

May 19, 2001 (KR) .......................................... 2001-27486

(51) Int. Cl.⁷ ................................................. G11B 7/00
(52) U.S. Cl. ..................... 369/124.12; 369/120
(58) Field of Search .......................... 369/44.41, 53.31, 369/120, 124.1, 124.11, 124.12

(56) References Cited

U.S. PATENT DOCUMENTS

| | | | | |
|---|---|---|---|---|
| 4,862,446 A | * | 8/1989 | Maeda | 369/112.28 |
| 4,920,527 A | * | 4/1990 | Maeda | 369/44.23 |
| 6,147,952 A | * | 11/2000 | Watabe | 369/111 |
| 6,222,804 B1 | * | 4/2001 | Yoshizawa | 369/44.41 |

* cited by examiner

Primary Examiner—Paul W. Huber
(74) Attorney, Agent, or Firm—Staas & Halsey LLP

(57) ABSTRACT

A method of detecting a reproduction signal from an optical disc. A light beam reflected from a recording surface of an optical disc is divided into a central light beam portion and outer light beam portions in a direction corresponding to a radial direction of the optical disc. The central light beam portion and outer light beam portions are detected and a first detection signal from the central light beam portion and a second detection signal from at least one of the outer light beam portions are output. The amplitude of at least one of the first and second detection signals is adjusted and the reproduction signal is detected by subtraction between the first detection and second detection signals so that where reproduction is carried out on an optical disc having a varying track width the reproduction signal is improved.

31 Claims, 9 Drawing Sheets

METHOD OF AND APPARATUS FOR REPRODUCING DATA RECORDED ON AN OPTICAL DISC

CROSS REFERENCE TO RELATED APPLICATIONS

This application claims the benefit of Korean Application No. 2001-27486 filed May 19, 2001, in the Korean Patent Office, the disclosure of which is incorporated herein by reference.

BACKGROUND OF THE INVENTION

1. Field of the Invention

The present invention relates to a method of and apparatus for detecting a reproduction signal from an optical disc having a varying track width.

2. Description of the Related Art

Recordable optical discs, such as a CD-R, a CD-RW, a DVD-RAM, a DVD-R, a DVD-RW, and a DVD+RW, have a guide groove along their tracks to enable an optical pickup to accurately track a desired track. A region of the optical disc with the guide groove is referred to as a "groove" and a remaining region is referred to as "land". Recording methods of such optical discs are classified into methods of recording user data on either land or grooves of the optical disc as in the CD-R/RWs, the DVD-R/RWs and the DVD+RW, and methods of recording user data on both land and grooves of the optical disc as in the DVD-RAM.

In manufacturing groove tracks and/or land tracks of recordable optical discs, a wobble signal for controlling a rotational speed of an optical disc and providing synchronization (sync) information is recorded by using a variation in a direction of amplitude of the wobble signal.

In addition, physical identification data (PID), such as sector address information, for indicating a physical location on an optical disc, is recorded on the optical disc in the manufacturing process. PID is recordable on an optical disc by a method of adding a PID signal to a wobble signal or by a method of forming uneven pre-pits in a header region or land of the optical disc.

A PID addressing method using a wobble signal, frequency or phase modulation of a wobble involves recording address information by adding frequency or phase variation in a predetermined period to a single-frequency wobble signal. A PID signal recorded overlapping the wobble signal is called a "wobble address".

As is known in the field to which the present invention pertains, CD-R/RW type optical discs record address information by frequency modulation of a wobble period, whereas DVD+RW type optical discs record address information by phase modulation of wobble. For both CD-R/RW and DVD+RW type optical discs, user data are recorded in only groove tracks so that PID addressing is achieved by forming a frequency-modulated or phase-modulated wobble on both sidewalls of each groove track.

In contrast, for land/groove-recordable optical discs such as a DVD-RAM in which user data is recordable in both land and groove tracks, it is impossible to realize PID addressing by merely forming a frequency-modulated or phase-modulated wobble on both sidewalls of each groove track. Thus, address information is recorded by forming uneven pre-pits in the header region of the disc. The PID addressing method using pre-pits has a problem of decreasing a recording capacity of the disc because user data cannot be recorded in the pre-pits region.

To maximize the recording capacity of land/groove-recordable optical discs, there is a need to increase a recordable region (user data region) by minimizing an overhead region (non-recording region), as well as to reduce a track pitch.

A wobble signal, which controls the rotational speed of the optical disc and provides sync information, is recorded in such land/groove-recordable optical discs. But it is not possible to record a PID signal to overlap the wobble signal in the land/groove-recordable optical disc by a known wobble addressing method.

Figure 1:
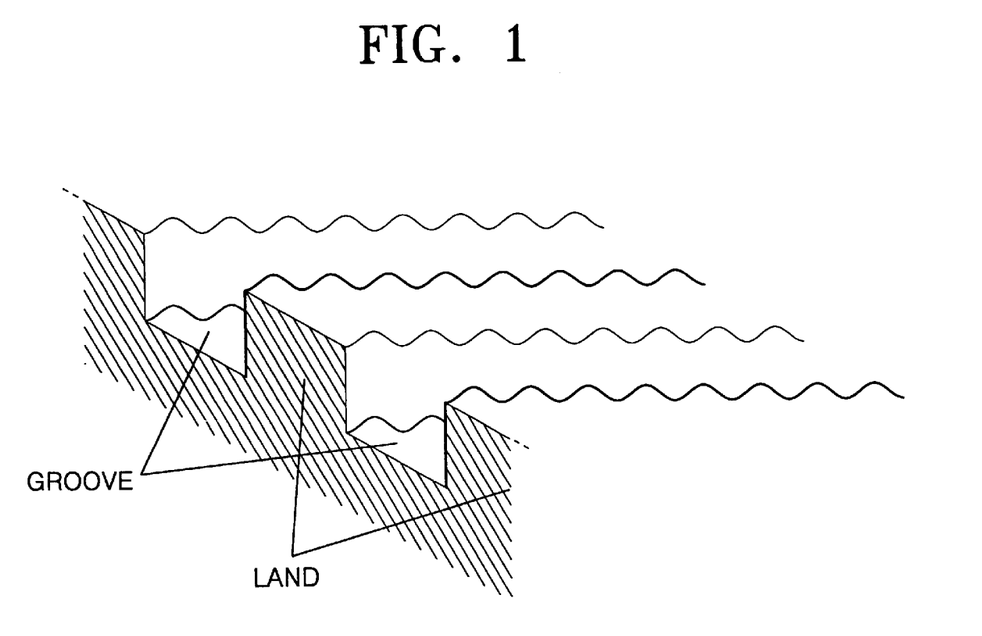
FIG. 1 shows an example where a wobble is formed in both groove and land tracks.

Referring to FIG. 1, the PID addressing method using a wobble signal is based on variation in the amplitude of a wobble in a target groove track. Thus, where wobble address information with respect to each groove track is recorded along both sidewalls of each groove track, address information recorded in two groove tracks adjacent to a land track is simultaneously read in a land track so that address information with respect to the land track is not accurately detected. Address information for both land and groove tracks is not represented with wobble address formed in groove tracks.

SUMMARY OF THE INVENTION

To solve the above-described problems, it is an object of the present invention to provide a method of and apparatus for reproducing data recorded on an optical disc in which an excellent reproduction signal is detectable during reproduction from the optical disc where the optical disc has a varying track width, particularly, a land/groove-recordable optical disc in which a wobble address for a land track is recorded by quadrature phase shift keying (QPSK) modulation.

Additional objects and advantages of the invention will be set forth in part in the description which follows, and, in part, will be obvious from the description, or may be learned by practice of the invention.

To achieve the above and other objects of the present invention, there is provided a method of detecting a reproduction signal from an optical disc, comprising: dividing a light beam reflected from a recording surface of the optical disc into a central light beam portion and outer light beam portions in a direction corresponding to a radial direction of the optical disc, detecting the divided central light beam and outer light beam portions, and outputting a first detection signal from the central light beam portion and a second detection signal from at least one of the outer light beam portions; adjusting an amplitude of at least one of the first detection signal and the second detection signal; and detecting a reproduction signal by subtraction between an adjusted first detection signal and the second detection signal, the first detection signal and an adjusted second detection signal, or an adjusted first detection signal and an adjusted second detection signal.

To further achieve the above and other objects of the present invention, there is also provided an apparatus for detecting a reproduction signal from an optical disc, comprising: a light beam division and detection unit which divides a light beam reflected from a recording surface of an optical disc into a central light beam portion and outer light beam portions in a direction corresponding to a radial direction of the optical disc and detects the central light beam and outer light beam portions; and a signal processor which adjusts an amplitude of a first detection signal from the central light beam portion and/or an amplitude of a second detection signal from at least one of the outer light beam portions and detects a reproduction signal by subtraction between the first detection and second detection signals having the adjusted amplitudes.

In the method and apparatus described above, the method and apparatus are operable to detect a reproduction signal from an optical disc having a guide groove formed to track a desired track and a track whose width varies according to the structure of the guide groove, wherein a phase-modulated wobble signal including address information is recorded along a track, and wobble signals recorded in two adjacent groove tracks have a predetermined phase relation, thereby enabling addressing of a land track interposed between the two adjacent groove tracks. The method and apparatus are also operable to detect address information modulated by bi-phase shift keying (BPSK) and recorded in the groove tracks of the optical disc, wherein the wobble signals recorded in the two adjacent groove tracks have a phase difference of 90° so that address information modulated by quadrature phase shift keying (QPSK) is recorded in the land track of the optical disc.

Preferably, the method and apparatus are operable to detect a reproduction signal where a wobble whose phase with respect to sine function is modulated by 0° and 180° is formed on both sidewalls of a predetermined guide groove and a wobble whose phase with respect to sine function is modulated by 90° and 270° is formed in a guide groove adjacent to the predetermined guide groove so that the width of a track interposed between the guide grooves varies.

Preferably, the method and apparatus are operable to detect a reproduction signal where the optical disc is a land/groove-recordable optical disc in which a wobble address is recorded and to detect a reproduction signal where a wobble is formed on only one of the sidewalls of the guide groove.

Preferably, the light beam division and detection unit divides the light beam reflected from the recording surface of the optical disc so that the central light beam portion corresponds to 10–90% of the diameter of the light beam.

Preferably, the light beam division and detection unit comprises a photodetector having a central light receiving section and outer light receiving sections arranged in a direction corresponding to the radial direction of the optical disc, wherein the central light receiving section receives the central light beam portion and the outer light receiving sections receive the outer light beam portions.

Preferably, the signal processor comprises: at least one gain controller which adjusts the amplitude of the first detection signal and/or the second detection signal from at least one of the outer light beam portions; and a subtractor which performs subtraction between the adjusted first and/or second detection signals/signal and outputs a result of the subtraction.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

To contribute to the understanding of the present invention, reference will now be made to co-pending U.S. application Ser. No. 09/704,654, filed Nov. 3, 2000 and assigned to the assignee of the present invention, the disclosure of which is incorporated herein by reference. To improve the overhead problem in the PID addressing method using uneven pre-pits and the drawback of the conventional wobble addressing method being incapable of being applied to the land/groove-recordable optical disc, a new technique applicable to a land/groove-recordable optical disc is disclosed in the Ser. No. 09/704,654 application. According to the disclosure in the Ser. No. 09/704,654 application, a bi-phase modulated wobble signal, i.e., a bi-phase shift keying (BPSK) wobble signal, is recorded in odd and even groove tracks and a quadrature phase modulated wobble signal, i.e., a quadrature phase shift keying (QPSK) wobble signal, is recorded in a land track.

Figure 2:
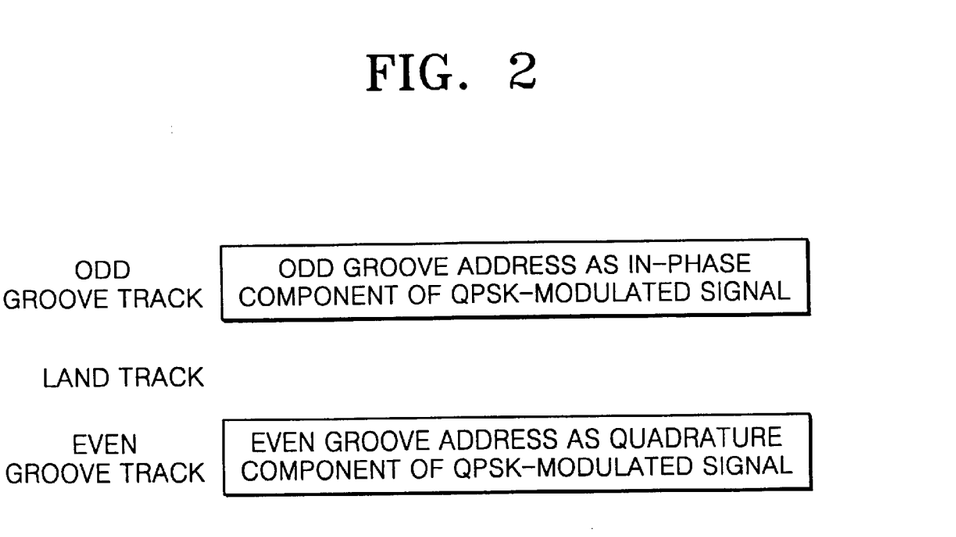
FIG. 2 shows a physical identification data (PID) addressing configuration.
Figure 3:
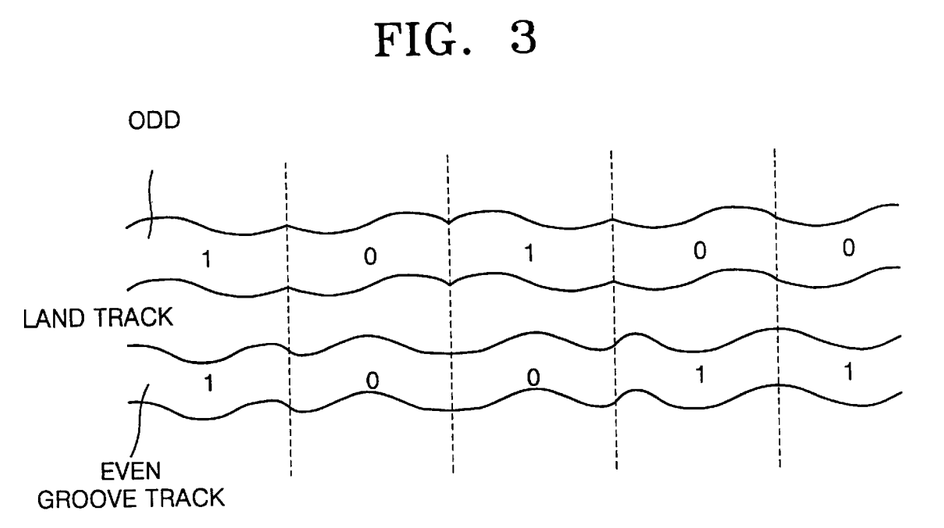
FIG. 3 shows a wobble signal to which a PID signal is added using the PID addressing configuration of FIG. 2.

FIGS. 2 and 3 show the PID addressing configuration and a wobble signal to which a PID signal is added, respectively, which are disclosed in the Ser. No. 09/704,654 application. Referring to FIG. 2, assuming that a predetermined groove track is an odd groove track and a groove track adjacent to the predetermined groove track is an even groove track, in the PID addressing configuration using a wobble signal as disclosed in the Ser. No. 09/704,654 application, a bi-phase modulated wobble signal is recorded in each of the odd groove and even groove tracks, and a carrier having a phase difference of 90° is used between the odd groove and even groove tracks. Accordingly, a QPSK modulated signal, which is the sum of wobble signals from the odd groove and even groove tracks, is read from the land track. Here, an in-phase component of the QPSK modulated signal is modulated from the address information of the odd groove track, and a quadrature component of the QPSK modulated signal is modulated from the address information of the even groove track.

As shown in FIG. 3, a 0°-phase wobble signal for an address data bit "0" and a 180°-phase wobble signal, which is the inverse of the phase of 0°, for an address data bit "1" are recorded in an odd groove track. A 90°-phase wobble signal for an address data bit "0" and a 270°-phase wobble signal, which is the inverse of the phase of 90° phase wobble signal, for an address data bit "1" are recorded in an even groove track.

The PID addressing configuration of FIG. 2 is applied only where tracks are formed with a constant angular velocity for adjacent tracks. Changes of both sidewalls of the groove track are constant so that a single beam may be used for mastering.

A wobble signal to which a PID signal is added by phase modulation satisfying the PID addressing configuration of FIG. 2 is expressed as equation set (1). In equation set (1), $w_{odd}(t)$ denotes an odd groove track, $w_{even}(t)$ denotes an even groove track, and $w_{land}(t)$ denotes a wobble signal of a land track to which a PID signal is added by phase modulation.

$$w_{odd}(t) = \sin(\omega t + a(nT))$$
$$w_{even}(t) = \cos(\omega t + b(nT)) \qquad (1)$$
$$\overline{\omega}_{land}(t) = \sin(\omega t + a(nT)) + \cos(\omega t + b(nT))$$

where $\omega = 2\pi f$, $f$ is a frequency of a wobble signal, and $a(nT)$ and $b(nT)$ satisfy expression (2):

$$a(nT), b(nT) \in \{\theta_1, \theta_2\} \qquad (2)$$

In expression (2), if $\theta_1$ and $\theta_2$, addressing information expressed by different phase angles have a phase difference of 0.180°, and wobble signal $w_{land}(t)$ for the land track becomes a QPSK-modulated signal. For example, if $a(nT) = 0°$ or $180°$ and $b(nT) = 90°$ or $270°$, wobble signal $w_{land}(t)$ for the land track becomes a QPSK-modulated signal.

Here, a wobble address from a track in which PID is addressed using wobble is detected from a push-pull signal obtained by subtracting the output signals of a 2-sectional photodetector, the push-pull signal being phase-modulated. Thus, in order to detect the phase component of an original signal (address information) from the wobble signal recorded as described above, multiplication by a carrier and low-pass-filtering of the product are carried out. That is, as a phase-modulated signal is multiplied by a carrier, an original signal corresponding to a DC term and a 2-fold multiplied higher harmonics component are generated. Then, the original signal is detectable by discarding the higher harmonics component through low-pass filtering. Here, a wobble signal of the odd groove track is multiplied by carrier $\sin(\omega t)$, a wobble signal of the even groove track by carrier $\cos(\omega t)$, and a QPSK-modulated wobble signal of the land track by $\cos(\omega t)$.

Land/groove-recordable optical discs manufactured by recording a QPSK-modulated wobble signal in a land track as described above have greater recording capacity due to a great reduction in overhead, compared with conventional land/groove-recordable optical discs in which addresses are recorded using pre-pits.

Figure 4:
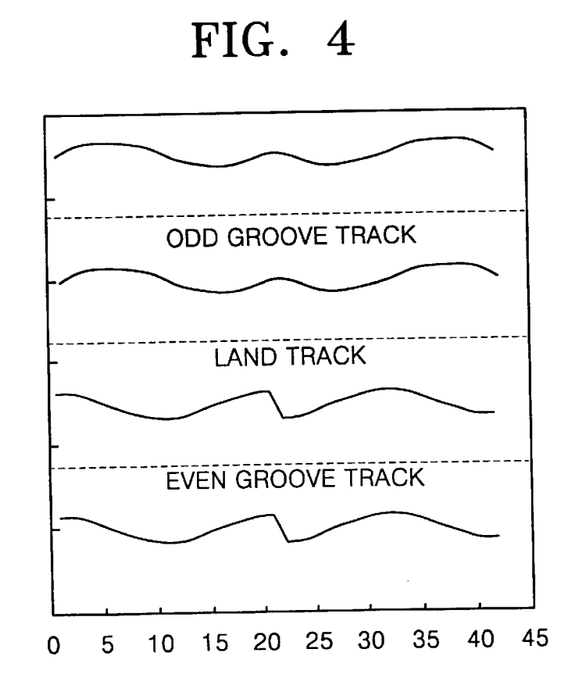
FIG. 4 shows a wobble of a land/groove-recordable optical disc in which wobble address for a land track is recorded by quadrature phase shift keying (QPSK) modulation.
Figure 5:
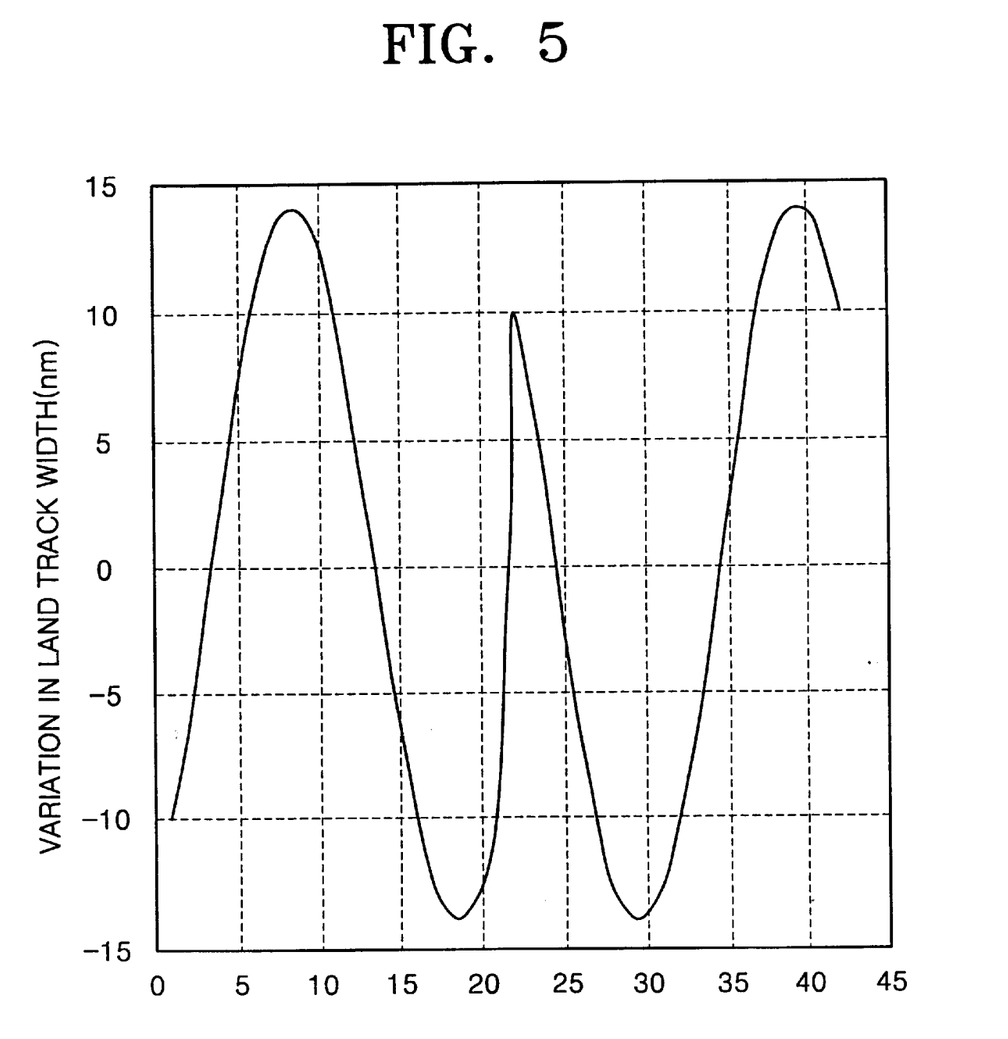
FIG. 5 is a graph showing variation in land track width where the optical disc of FIG. 4 has a wobble amplitude of ±10 nm.

For the land/groove-recordable optical disc in which a wobble address for a land track is recorded by QPSK modulation as described above, track widths, and particularly the land track width is not constant, as shown in FIGS. 4 and 5. FIG. 4 shows a part of a land/groove-recordable optical disc in which wobble address for a land track is recorded by QPSK modulation. FIG. 5 is a graph of variation in the width of a land track where a wobble amplitude is ±10 nm. The horizontal axes for FIGS. 4 and 5 indicate arbitrary positions along a track.

Thus, during reproduction from a land track of the land/groove-recordable optical disc as described above, a radio-frequency (RF) signal, which is reproduced by a conventional reproduction signal detection method in which the output signals of multiple sectional plates of a photodetector are simply summed, deteriorates due to track width variation.

Figure 6:
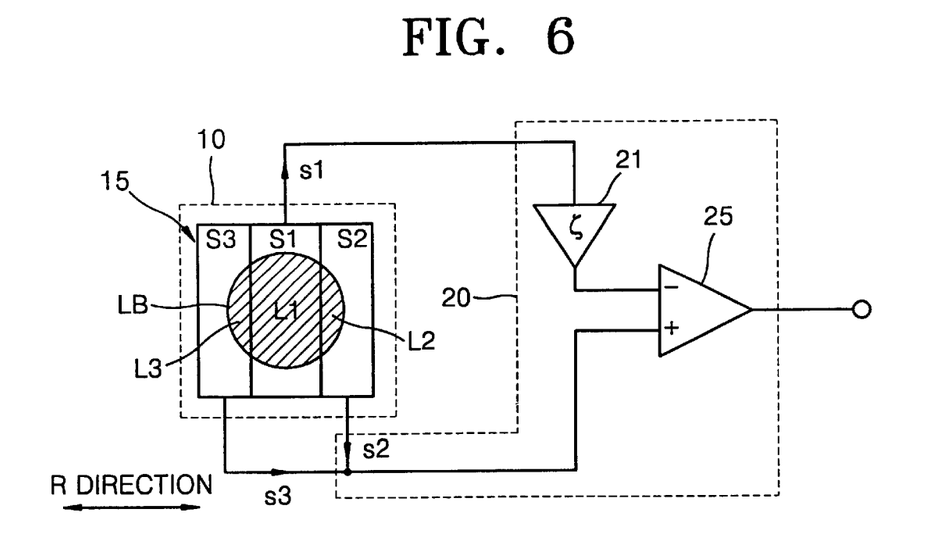
FIG. 6 is a block diagram of an embodiment of an optical disc reproduction apparatus according to the present invention.

Turning now to the present invention and referring to FIG. 6, which is a block diagram of an embodiment of an optical disc reproduction apparatus according to the present invention, the optical disc reproduction apparatus comprises a light beam division and detection unit 10 and a signal processor 20 which detect a reproduction signal in reproduction from an optical disc having a varying track width, by correcting a component of the reproduction signal degraded by variation in the track width. The basic configuration of an optical pickup in which a light beam is emitted onto a recording surface of an optical disc, and a light beam reflected from the recording surface of the optical disc is transmitted to a detector is well known in the field of the present invention. Thus, a detailed description and illustration of the basic configuration of the optical pickup is not provided here.

In the present invention, a light beam division and detection unit 10 detects a light beam LB reflected from the recording surface of the optical disc onto a central light beam portion L1 corresponding to 10–90% of a diameter of the light beam LB and onto outer light beam portions L2 and L3 in a direction (R) corresponding to a radial direction of the optical disc and outputs a first detection signal s1 with respect to the central light beam portion L1 and a pair of second detection signals s2 and s3 with respect to the outer light beam portions L2 and L3.

Figure 7A:
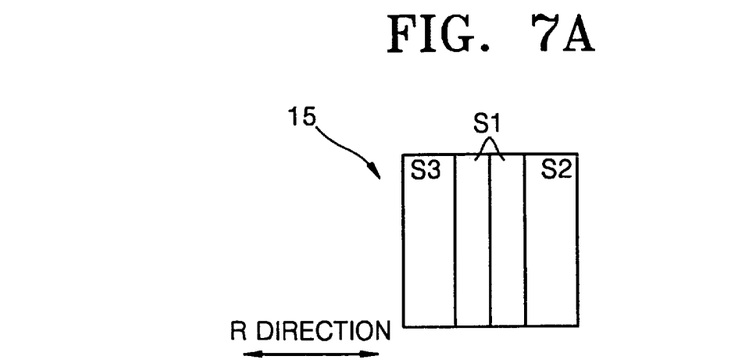
FIG. 7A shows an alternate example of a photodetector applicable to the optical disc reproduction apparatus of FIG. 6.
Figure 7B:
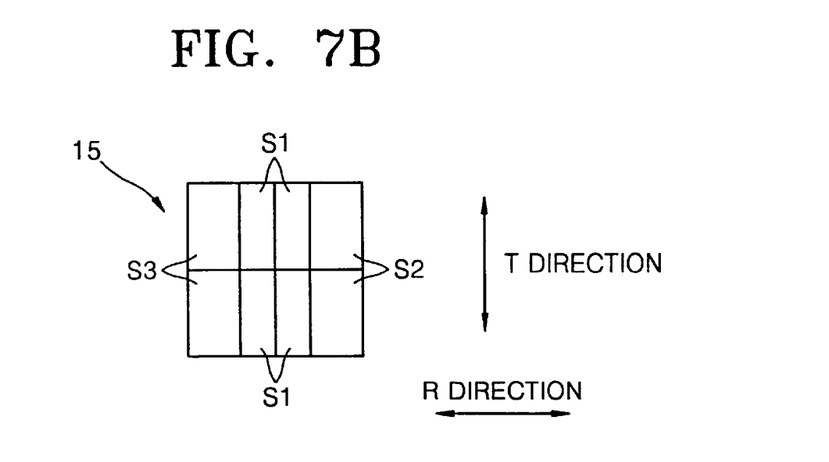
FIG. 7B shows another example of a photodetector applicable to the optical disc reproduction apparatus of FIG. 6.

As shown in FIG. 6, the light beam division and detection unit 10 is a photodetector 15 having a structure of at least three sections, a central light receiving section S1 and a pair of outer light receiving sections S2 and S3 arranged in the R direction. The central light receiving section S1 receives the central light beam portion L1 and outputs the first detection signal s1, and the outer light receiving sections S2 and S3 receive the outer light beam portions L2 and L3 and output the second detection signals s2 and s3. Alternatively, the photodetector 15 may have a 4-sectional structure having four sections in the R direction, in which the central light receiving section S2 is divided into 2 sections, as shown in FIG. 7A. Alternatively, the photodetector 15 may have an 8-sectional structure which is divided into four sections in the R direction and into two sections in a direction (T) corresponding to the tangential direction of the optical disc wherein the center light receiving section S1 is divided in both R and T directions, and the outer light receiving sections S2 and S3 are divided in the T direction, as shown in FIG. 7B.

Alternatively, the light beam division and detection unit 10 may include a diffraction element, e.g., a hologram optical element (HOE), which divides the light beam reflected from the optical disc into the central light beam portion L1 and the outer light beam portions L2 and L3, and a photodetector which converts the central light beam portion L1 and the outer light beam portions L2 and L3 divided by the diffraction element and photoelectrically converts the L1, L2 and L3 portions.

The signal processor 20 adjusts an amplitude of the first detection signal s1 and/or an amplitude of at least one the second detection signals s2 and/or s3 from the outer light beam portions L2 and L3 and detects a reproduction signal by subtraction between the first and second detection signals.

For example, the signal processor 20 may include a gain controller 21 which adjusts the amplitude of the first detection signal s1 from the central light beam portion L1 and a subtractor 25 which subtracts a sum signal s2+s3 of the second detection signals s2 and s3 corresponding to the outer light beam portions L2 and L3 from the first detection signal s1 whose amplitude is adjusted. The gain controller 21 amplifies or reduces the input first detection signal s1 and outputs a signal obtained by multiplying the input first detection signal s1 by a predetermined adjusting factor $\zeta$ (zeta). A differential amplifier is usable as the subtractor 25.

Alternatively, the signal processor 20 may be constructed to detect a reproduction signal by performing a signal process after adjusting the amplitude of the second detection signal from at least one of the outer light beam portions. The signal processor 20 may be constructed to include a plurality of gain controllers such that the amplitudes of the first detection signal s1 from the central light beam portion L1 and of the second detection signals s2 and s3 from the outer light beam portions L2 and L3 are separately adjusted and processed to detect a reproduction signal.

The signal processor may further perform a post-process for a difference signal output from the subtractor 25. This post-process is well known in the field of the present invention, and thus a detailed description thereof will not be provided here.

The optical disc reproduction apparatus according to the present invention described above detects a reproduction signal from an optical disc having a varying track pitch as follows.

As an example, reproduction of a signal from the land/groove-recordable optical disc (hereinafter referred to as "QPSK optical disc") described with reference to FIG. 4, in which wobble address modulated by ±sin(ωt) (phase-modulated by 0° and 180° with respect to the sine function) is recorded in an odd groove track, a wobble address modulated by ±cos(ωt) (phase-modulated by 90° and 270° with respect to the sine function) is recorded in an even groove track, and address information is recorded in a land track by QPSK modulation, will be described.

Figure 8:
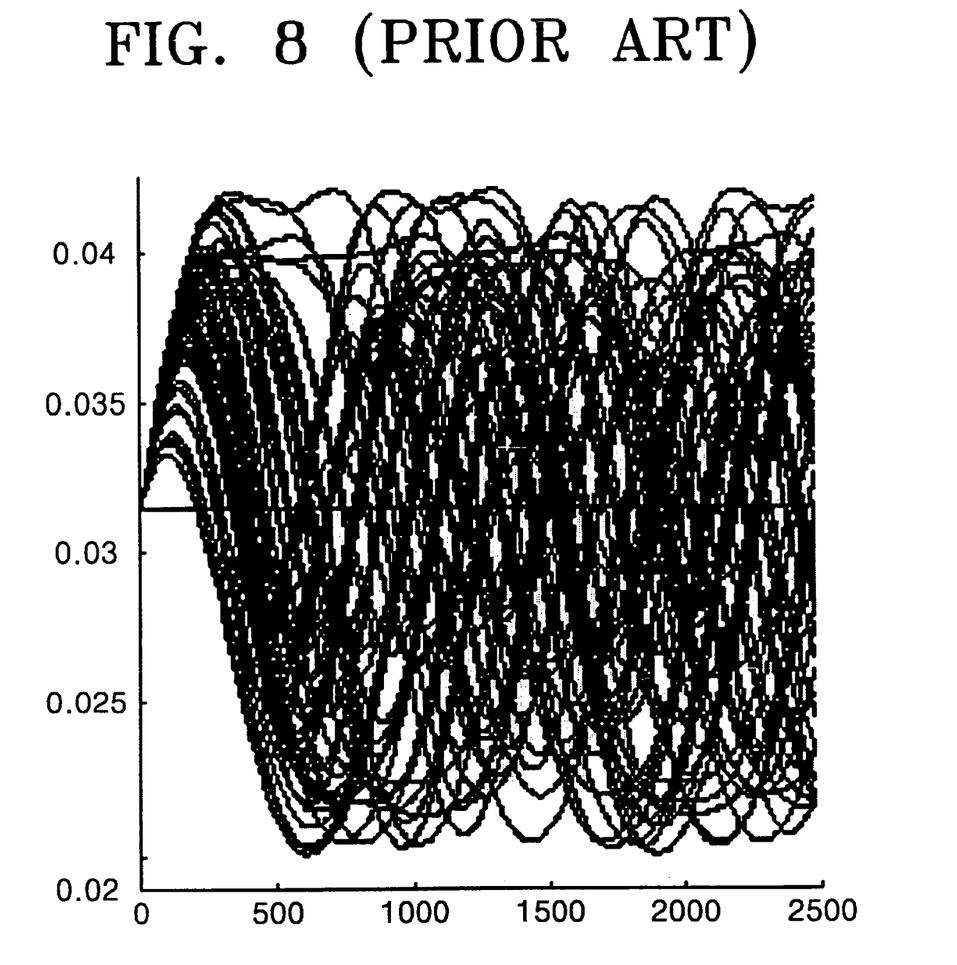
FIG. 8 is a graph of an eye-pattern of a radio-frequency (RF) signal reproduced by a conventional reproduction method.

FIG. 8 which shows an eye-pattern of an RF signal, which has been coded by eight-to-fourteen modulation (EFM+) on a QPSK optical disc and reproduced from a land track by a conventional reproduction method under the conditions shown in Table 1. As shown in FIG. 8, the RF signal is sharply degraded for reproduction from the land track due to the wobble structure (variation in track width). The reproduced RF signal has 30% greater jitter (data-to-data jitter) than that from a wobble-free optical disc (having a jitter of about 6%). This jitter is slightly reduced by using a band-pass filter.

TABLE 1

| | |
|---|---|
| wavelength (λ) of light source | 400 nm |
| width of groove | 0.3 μm |
| depth of groove | λ/6 |
| Length of channel bit | 0.0617 μm |
| period of wobble | 200 channel clocks |
| amplitude of wobble | ±10 nm |
| NA of objective lens | 0.85 |

Figure 9:
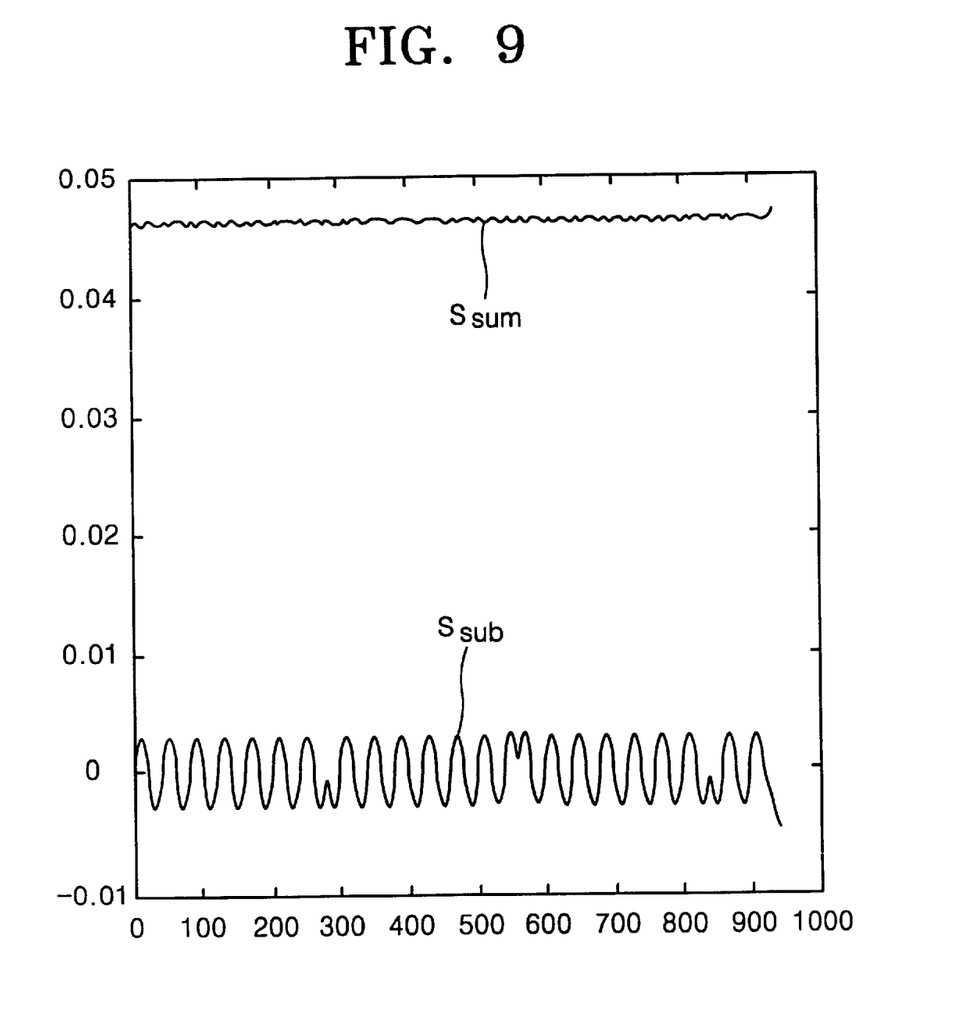
FIGS. 9 and 10 are graphs comparatively showing a sum signal ($S_{sum}$) and a difference signal ($S_{sub}$) produced by a conventional reproduction method for odd groove and even groove tracks of a land/groove-recordable optical disc in which address information for a land track is recorded by QPSK modulation.
Figure 10:
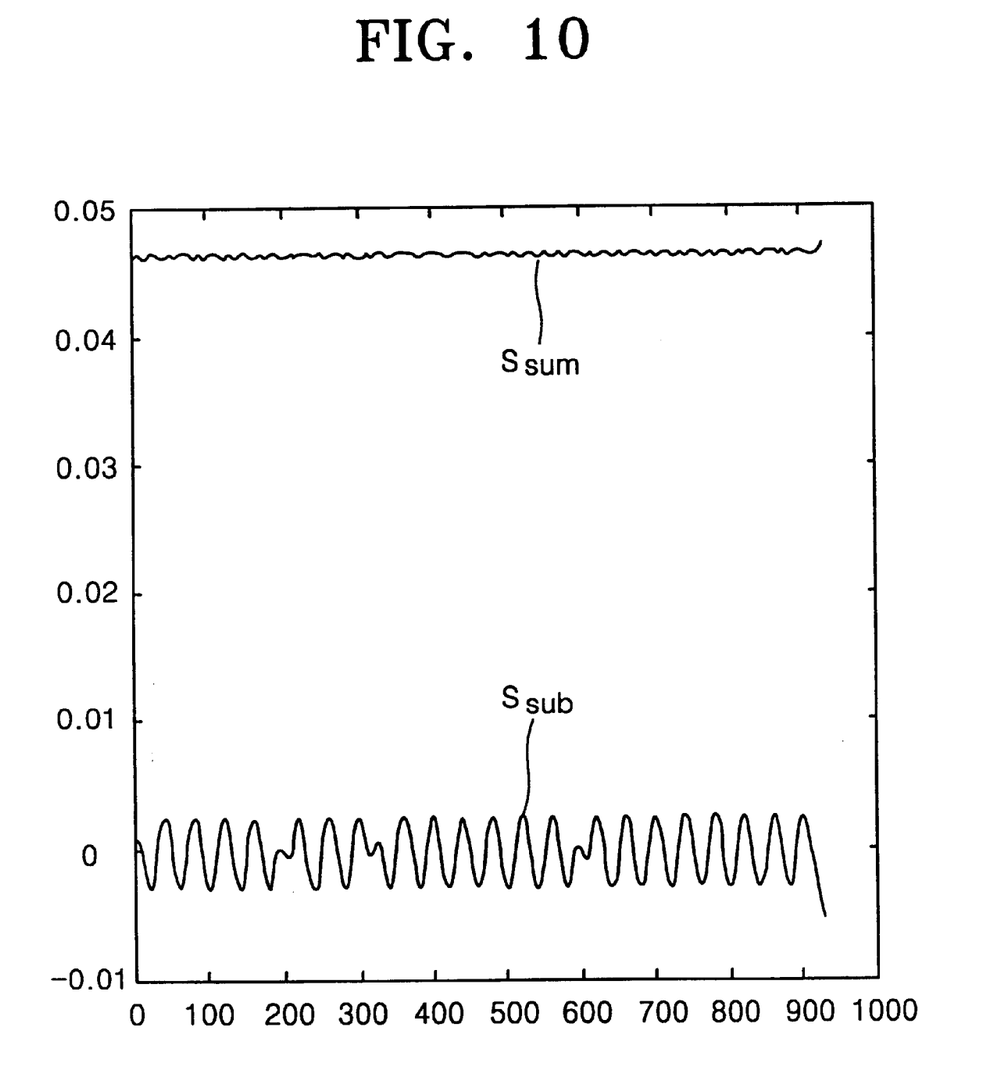
Figure 11:
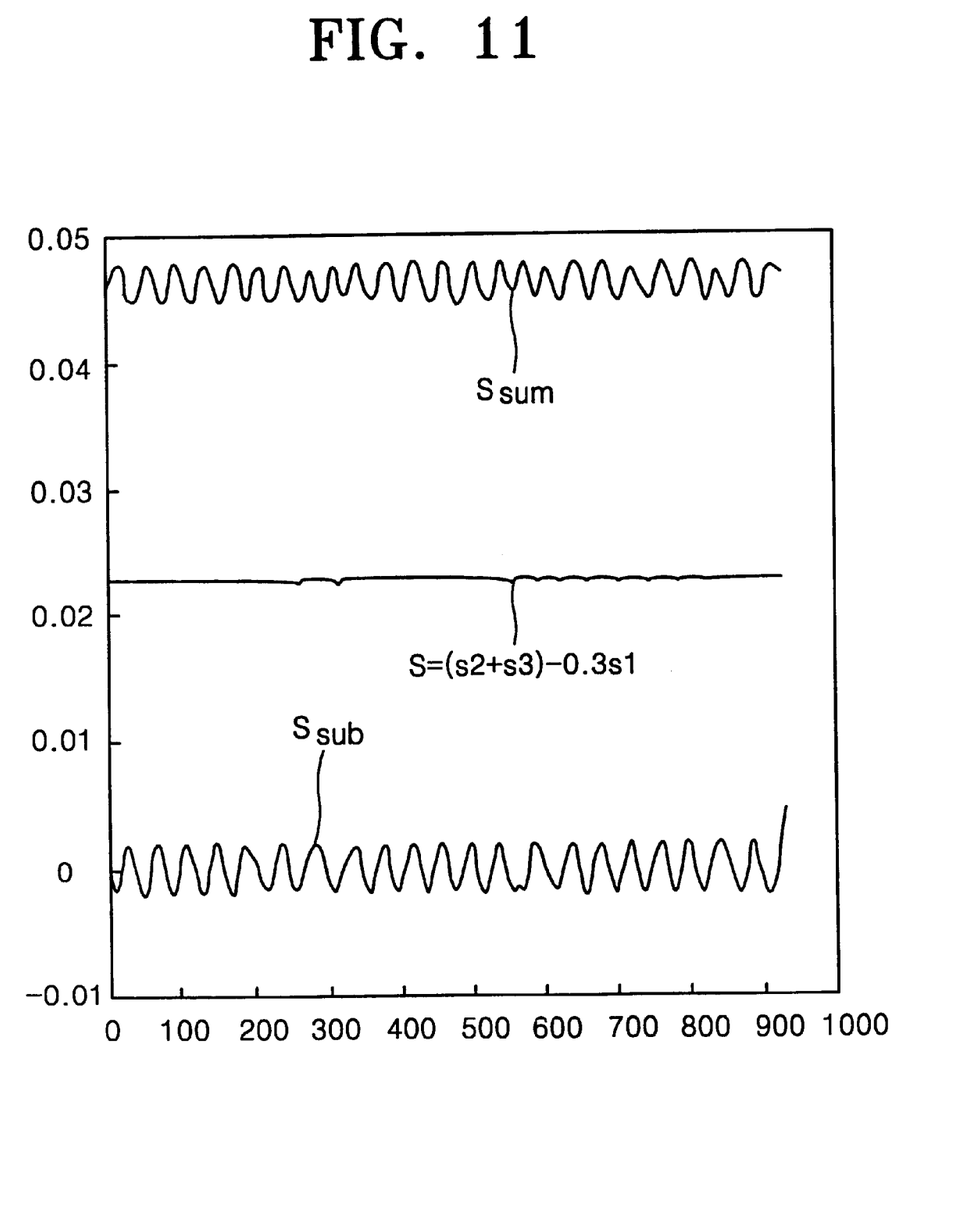
FIG. 11 is a graph comparatively showing the sum signal ($S_{sum}$) and difference signal ($S_{sub}$) produced by the conventional reproduction method and a reproduction signal (S) obtained by a method according to the present invention for a land track of a land/groove-recordable optical disc in which address information for the land track is recorded by QPSK modulation.

Such deterioration of an RF signal reproduced by the conventional reproduction method, which occurs during reproduction from a QPSK optical disc due to variation in the width of the land track, is also evident in the graphs of FIGS. 9 through 11. FIGS. 9 through 11 show the sum signal ($S_{sum}$) of signals detected by dividing the light beam LB reflected from a recording surface of the QPSK optical signal in a conventional reproducing method and difference signal ($S_{sub}$), which is also known as a common push-pull signal and detected by dividing the light beam LB into two light beam portions in the R direction, the detection signals reproduced from an odd groove track, even groove track, and land track of a QPSK optical disc, respectively.

As shown in FIGS. 9 and 10, for the reproduction from the groove tracks of the QPSK optical disc, due to constant widths of the groove tracks, the sum signal ($S_{sum}$) reproduced by the conventional reproduction method has a negligible AC component compared to the subtraction signal ($S_{sub}$). That is, the wobble structure has little effect on reproduction of the RF signal from grooves.

In contrast, for the reproduction from the land track of the QPSK optical disc, as shown in FIG. 11, due to the varying width of the land track, the sum signal ($S_{sum}$) reproduced by the conventional reproduction method has a similar level of AC component to the subtraction signal ($S_{sub}$). That is, because of changes in the width of the land track due to the wobble structure, the RF signal reproduced by the conventional method from the land track is markedly degraded.

However, where the light beam LB reflected from the recording surface of a QPSK optical disc is divided into the central light beam portion L1 and the outer light beam portions L2 and L3, detected, and processed by the reproduction method according to the present invention described above, an excellent reproduction signal S from which almost all AC component is removed is detected, as shown in FIG. 11. The reproduction signal S reproduced by the reproduction method according to the present invention shown in FIG. 11, is obtained by subtracting the first detection signal s1 corresponding to the central light beam portion L1 multiplied by a gain adjusting factor $\zeta(=0.3)$ from the sum of the second detection signals s2 and s3 corresponding to the pair of outer light beam portions L2 and L3, which is expressed as (s2+s3)−0.3·s1.

Figure 12:
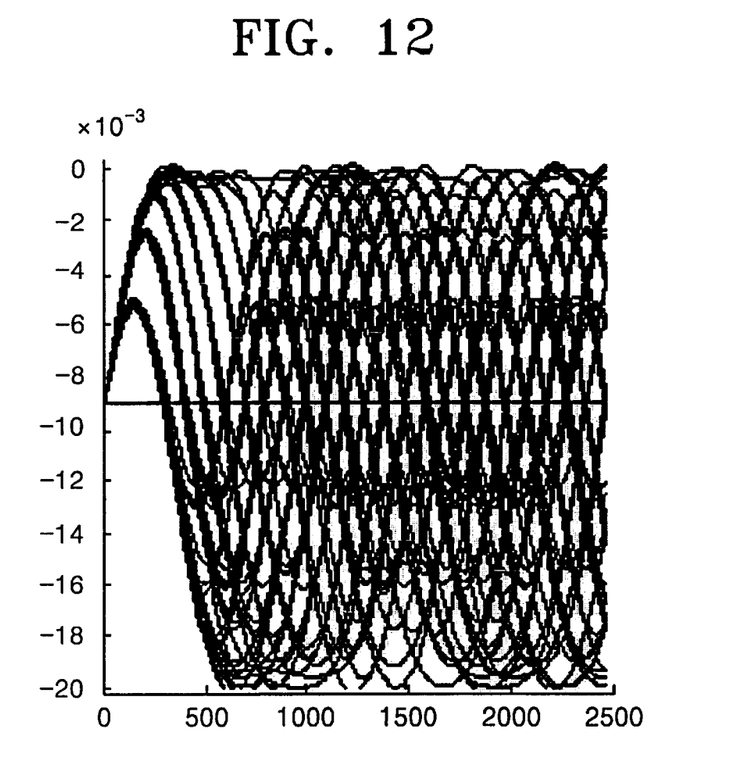
FIG. 12 is a graph of the eye-pattern of the reproduction signal (S) reproduced by the method according to the present invention.

Under the conditions shown in Table 1, where an RF signal coded in a QPSK optical disc by EFM+ is reproduced from a land track of the QPSK optical disc by the reproduction method according to the present invention, FIG. 12 shows the eye-pattern of a reproduction signal S reproduced by the reproduction method according to the present invention with a gain adjusting factor constant $\zeta$ of 0.3 is shown. Clearly, the eye-pattern of the reproduction signal shown in FIG. 12 is better than the eye pattern for the reproduction signal detected by the conventional optical disc reproduction method as shown in FIG. 8. Actually, the reproduction signal S detected by the optical disc reproduction method according to the present invention has a data-to-data jitter of about 10%, which is lower compared with the conventional case described with reference to FIG. 8 where the data-to-data jitter is about 30%.

Thus, in the reproduction method according to the present invention, deterioration of a reproduction signal caused by variation in track width for reproduction from an optical disc having a variable track width is corrected, thereby detecting an excellent reproduction signal. For example, an excellent reproduction signal is detectable from an optical disc having guide grooves along which a desired track is tracked and having a track width that varies according to a structure of the guide grooves. Here, the guide grooves correspond to groove tracks, and a track interposed between the two guide grooves corresponds to a land track.

Here, the optical disc having a guide groove and a varying track width may be, for example, a land/groove-recordable optical disc in which a phase-modulated wobble signal including address information is recorded along a track, and the land track interposed between two adjacent groove tracks is addressable because wobble signals recorded in the two adjacent groove tracks have a predetermined phase relation.

The land/groove-recordable optical disc preferably has a structure in which BPSK-modulated address information is recorded in groove tracks, wobble signals recorded in two adjacent groove tracks have a phase difference of 90°, and QPSK-modulated address information is recorded in a land track. In other words, the land/groove-recordable optical disc may have a structure in which a wobble whose phase with respect to sine function is modulated by 0° and 180° is formed on both sidewalls of a predetermined guide groove, i.e., an odd groove track, a wobble whose phase with respect to sine function is modulated by 90° and 270° is formed on both sidewalls of a groove track adjacent to the predetermined guide track, i.e., an even groove track adjacent to the odd guide track, and address information which is quadrature phase modulated is recorded in a track interposed between the guide grooves, i.e., a land track.

Figure 13:
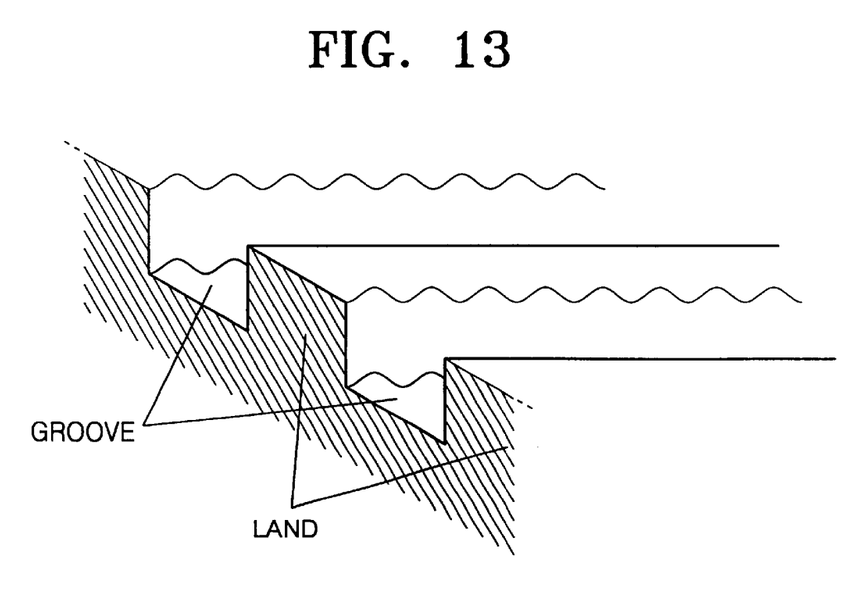
FIG. 13 shows an optical disc in which a wobble is formed on one of the sidewalls of a guide groove.

A technical description of a land/groove-recordable optical disc in which a wobble address is recorded as described above is disclosed in the U.S. patent application Ser. No. 09/704,654. Another example of the optical disc having a guide groove and a varying track width, as shown in FIG. 13, is an optical disc having a wobble only on one of the sidewalls of the guide grooves, for example, an advanced storage-magneto optical (ASMO) disc.

According to the present invention as described above, where reproduction is carried out on an optical disc having a varying track width, a reproduction signal with excellent characteristics is detectable from the optical disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of detecting a reproduction signal from an optical disc, comprising:
   dividing a light beam reflected from a recording surface of an optical disc into a central light beam portion and outer light beam portions in a direction corresponding to a radial direction of the optical disc;
   detecting the divided central light beam and outer light beam portions, and outputting a first detection signal from the central light beam portion and a second detection signal from at least one of the outer light beam portions;
   adjusting an amplitude of at least one of the first and second detection signal; and
   detecting a reproduction signal by subtraction between the first and second detection signals, after the amplitude adjustment.

2. The method of claim 1, wherein the optical disc comprises a guide groove formed on the optical disc to track a desired track of the optical disc and has a track whose width varies according to a structure of the guide groove.

3. The method of claim 2, wherein, in the optical disc, a phase-modulated wobble signal including address information is recorded along a track of the optical disc, and wobble signals recorded in two adjacent groove tracks of the optical disc have a predetermined phase relation, thereby enabling addressing of a land track interposed between the two adjacent groove tracks.

4. The method of claim 3, wherein address information modulated by bi-phase shift keying (BPSK) is recorded in the groove tracks of the optical disc, and the wobble signals recorded in the two adjacent groove tracks have a phase difference of 90° so that address information modulated by quadrature phase shift keying (QPSK) is recorded in the land track of the optical disc.

5. The method of claim 2, wherein a wobble whose phase with respect to a sine function is modulated by 0° and 180° is formed on both sidewalls of a predetermined guide groove of the optical disc, a wobble, whose phase with respect to the sine function is modulated by 90° and 270°, is formed in another guide groove of the optical disc adjacent to the predetermined guide groove so that a width of a track interposed between the guide groove and the another guide groove varies.

6. The method of claim 2, wherein the optical disc is a land/groove-recordable optical disc in which a wobble address is recorded.

7. The method of claim 3, wherein the optical disc is a land/groove-recordable optical disc in which a wobble address is recorded.

8. The method of claim 4, wherein the optical disc is a land/groove-recordable optical disc in which a wobble address is recorded.

9. The method of claim 5, wherein the optical disc is a land/groove-recordable optical disc in which a wobble address is recorded.

10. The method of claim 2, wherein a wobble is formed on one the adjacent sidewalls of the guide groove.

11. The method of claim 2, wherein the guide groove is a groove track and the track interposed between the two guide grooves is a land track.

12. The method of claim 5, wherein the guide groove is a groove track and the track interposed between the two guide grooves is a land track.

13. The method of claim 10 wherein the guide groove is a groove track and the track interposed between the two guide grooves is a land track.

14. An apparatus for reproducing a signal from an optical disc, comprising:
   a light beam division and detection unit which divides a light beam reflected from a recording surface of the optical disc into a central light beam portion and outer light beam portions in a direction corresponding to a radial direction of the optical disc and outputs first and second detection signals corresponding to the central light beam portion and outer light beam portions, respectively; and
   a signal processor which detects a reproduction signal by subtraction between the first and second detection signals, wherein the signal processor adjusts an amplitude of at least one of the first and second detection signals prior to the subtraction.

15. The optical disc reproduction apparatus of claim 14, wherein the optical disc comprises a guide groove formed to track a desired track and has a track whose width varies according to the structure of the guide groove.

16. The optical disc reproduction apparatus of claim 15, wherein, in the optical disc, a phase-modulated wobble signal including address information is recorded along a track, and wobble signals recorded in two adjacent groove tracks have a predetermined phase relation, thereby enabling addressing of a land track interposed between the two adjacent groove tracks.

17. The optical disc reproduction apparatus of claim 16, wherein address information modulated by bi-phase shift keying (BPSK) is recorded in the groove tracks of the optical disc, and the wobble signals recorded in the two adjacent groove tracks have a phase difference of 90° so that address information modulated by quadrature phase shift keying (QPSK) is recorded in the land track of the optical disc.

18. The optical disc reproduction apparatus of claim 15, wherein a first wobble, whose phase with respect to a sine function is modulated by 0° and 180°, is formed on both sidewalls of a predetermined guide groove, and a second wobble, whose phase with respect to sine function is modulated by 90° and 270°, is formed in another guide groove adjacent to the predetermined guide groove so that a width of a track interposed between the predetermined guide groove and the another guide groove varies.

19. The optical disc reproduction apparatus of claim 15, wherein the optical disc is a land/groove-recordable optical disc in which a wobble address is recorded.

20. The optical disc reproduction apparatus of claim 16, wherein the optical disc is a land/groove-recordable optical disc in which a wobble address is recorded.

21. The optical disc reproduction apparatus of claim 17, wherein the optical disc is a land/groove-recordable optical disc in which a wobble address is recorded.

22. The optical disc reproduction apparatus of claim 18, wherein the optical disc is a land/groove-recordable optical disc in which a wobble address is recorded.

23. The optical disc reproduction apparatus of claim 15, wherein a wobble is formed on only one of the sidewalls of the predetermined guide groove.

24. The optical disc reproduction apparatus of claim 15, wherein the guide groove is a groove track and the track interposed between the two guide grooves is a land track.

25. The optical disc reproduction apparatus of claim 14, wherein the light beam division and detection unit divides the central light beam portion to correspond to 10–90% of the diameter of the light beam in the direction corresponding to the radial direction of the optical disc.

26. The optical disc reproduction apparatus of claim 14, wherein:

the light beam division and detection unit comprises a photodetector comprising a central light receiving section and outer light receiving sections arranged in a direction corresponding to the radial direction of the optical disc, and the central light receiving section receives the central light beam portion and the outer light receiving sections receive the outer light beam portions.

27. The optical disc reproduction apparatus of claim 25, wherein:

the light beam division and detection unit comprises a photodetector comprising a central light receiving section and outer light receiving sections arranged in a direction corresponding to the radial direction of the optical disc, and the central light receiving section receives the central light beam portion and the outer light receiving sections receive the outer light beam portions.

28. The optical disc reproduction apparatus of claim 14, wherein the signal processor comprises:

at least one gain controller which adjusts the amplitude of the first detection signal and/or the second detection signal; and a subtractor which performs the subtraction and outputs a result of the subtraction.

29. The optical disc reproduction apparatus of claim 25, wherein the signal processor comprises:

at least one gain controller which adjusts the amplitude of the first detection signal and/or the second detection signal; and a subtractor which performs the subtraction and outputs a result of the subtraction.

30. The method of claim 1, wherein in the adjusting of the at least one of the first and second detection signals, the amplitude of one of the first and second detection signals is adjusted by a factor of 0.3.

31. The apparatus of claim 14, wherein the signal processor adjusts the amplitude of the at least one of the first and second detection signals prior to the subtraction by a factor of 0.3.

* * * * *